United States Patent
Lynn et al.

(10) Patent No.: US 9,449,476 B2
(45) Date of Patent: Sep. 20, 2016

(54) LOCALIZED HAPTIC FEEDBACK

(71) Applicant: Sentons Inc., Grand Cayman (KY)

(72) Inventors: Lapoe E. Lynn, Los Altos, CA (US);
Samuel W. Sheng, Saratoga, CA (US);
Shih-Ming Shih, San Jose, CA (US);
Yenyu Hsieh, San Jose, CA (US)

(73) Assignee: Sentons Inc. (KY)

( * ) Notice: Subject to any disclaimer, the term of this patent is extended or adjusted under 35 U.S.C. 154(b) by 444 days.

(21) Appl. No.: 13/681,286

(22) Filed: Nov. 19, 2012

(65) Prior Publication Data
US 2013/0127755 A1    May 23, 2013

Related U.S. Application Data

(60) Provisional application No. 61/561,678, filed on Nov. 18, 2011.

(51) Int. Cl.
| | |
|---|---|
| G06F 3/043 | (2006.01) |
| G06F 3/041 | (2006.01) |
| G06F 3/01 | (2006.01) |
| G05B 15/02 | (2006.01) |
| G08B 6/00 | (2006.01) |

(52) U.S. Cl.
CPC .......... *G08B 6/00* (2013.01); *G06F 3/016* (2013.01); *G06F 3/0416* (2013.01); *G06F 3/0436* (2013.01)

(58) Field of Classification Search
CPC .. G06F 3/016; G06F 2203/014; G06F 3/041; G06F 3/043
USPC ...... 726/2; 715/863; 701/48; 463/22, 36, 39; 455/566; 361/679.01; 345/157, 169, 345/173–174, 177, 179, 211, 419; 342/451; 340/407.2
See application file for complete search history.

(56) References Cited

U.S. PATENT DOCUMENTS

| | | | |
|---|---|---|---|
| 4,488,000 A | 12/1984 | Glenn | |
| 5,334,805 A | 8/1994 | Knowles et al. | |
| 5,451,723 A | 9/1995 | Huang et al. | |
| 5,563,849 A | 10/1996 | Hall et al. | |
| 5,573,077 A | 11/1996 | Knowles | |
| 5,637,839 A | 6/1997 | Yamaguchi et al. | |
| 5,708,460 A * | 1/1998 | Young | G06F 3/0414 178/18.03 |
| 5,739,479 A | 4/1998 | Davis-Cannon et al. | |

(Continued)

FOREIGN PATENT DOCUMENTS

| | | | | |
|---|---|---|---|---|
| FR | 2948787 A1 | 2/2011 | | |
| GB | WO 2012/010912 | * | 7/2011 | ............. G06F 3/041 |

(Continued)

OTHER PUBLICATIONS

Liu et al., "Acoustic Wave Approach for Multi-Touch Tactile Sensing", Micro-NanoMechatronics and Human Science, 2009. MHS 2009. International Symposium, Nov. 9-11, 2009.

*Primary Examiner* — Lin Li
(74) *Attorney, Agent, or Firm* — Van Pelt, Yi & James LLP

(57) ABSTRACT

A haptic feedback system is disclosed. The system includes a plurality of remote transmitters that are remote from a location of interest on a surface of the system. The system includes a signal generator that generates a signal for each of the remote transmitters. The remote transmitters propagate the signals through a medium of the surface and the signals interfere at the location of interest such that a localized disturbance is generated at the location of interest.

20 Claims, 9 Drawing Sheets

(56) References Cited

U.S. PATENT DOCUMENTS

| | | |
|---|---|---|
| 5,784,054 A | 7/1998 | Armstrong et al. |
| 5,883,457 A | 3/1999 | Rinde et al. |
| 5,912,659 A | 6/1999 | Rutledge et al. |
| 6,091,406 A | 7/2000 | Kambara et al. |
| 6,232,960 B1 | 5/2001 | Goldman |
| 6,254,105 B1 | 7/2001 | Rinde et al. |
| 6,473,075 B1 | 10/2002 | Gomes et al. |
| 6,492,979 B1 | 12/2002 | Kent et al. |
| 6,535,147 B1 | 3/2003 | Masters et al. |
| 6,567,077 B2 | 5/2003 | Inoue et al. |
| 6,630,929 B1 | 10/2003 | Adler et al. |
| 6,633,280 B1 | 10/2003 | Matsumoto et al. |
| 6,636,201 B1 | 10/2003 | Gomes et al. |
| 6,788,296 B2 | 9/2004 | Ikeda et al. |
| 6,798,403 B2 | 9/2004 | Kitada et al. |
| 6,856,259 B1 | 2/2005 | Sharp |
| 6,891,527 B1 | 5/2005 | Chapman et al. |
| 6,948,371 B2 | 9/2005 | Tanaka et al. |
| 7,000,474 B2 | 2/2006 | Kent |
| 7,006,081 B2 | 2/2006 | Kent et al. |
| 7,116,315 B2 | 10/2006 | Sharp et al. |
| 7,119,800 B2 | 10/2006 | Kent et al. |
| 7,187,369 B1 | 3/2007 | Kanbara et al. |
| 7,193,617 B1 | 3/2007 | Kanbara et al. |
| 7,204,148 B2 | 4/2007 | Tanaka et al. |
| 7,218,248 B2 | 5/2007 | Kong et al. |
| 7,274,358 B2 | 9/2007 | Kent |
| RE39,881 E | 10/2007 | Flowers |
| 7,315,336 B2 | 1/2008 | North et al. |
| 7,345,677 B2 | 3/2008 | Ing et al. |
| 7,411,581 B2 | 8/2008 | Hardie-Bick |
| 7,456,825 B2 | 11/2008 | Kent et al. |
| 7,511,711 B2 | 3/2009 | Ing et al. |
| 7,545,365 B2 | 6/2009 | Kent et al. |
| 7,554,246 B2 | 6/2009 | Maruyama et al. |
| 7,583,255 B2 | 9/2009 | Ing |
| 7,649,807 B2 | 1/2010 | Ing |
| 7,683,894 B2 | 3/2010 | Kent |
| 7,880,721 B2 | 2/2011 | Suzuki et al. |
| 7,920,133 B2 | 4/2011 | Tsumura et al. |
| 8,085,124 B2 | 12/2011 | Ing |
| 8,228,121 B2 | 7/2012 | Benhamouda et al. |
| 8,237,676 B2 | 8/2012 | Duheille et al. |
| 8,319,752 B2 | 11/2012 | Hardie-Bick |
| 8,325,159 B2 | 12/2012 | Kent et al. |
| 8,358,277 B2 | 1/2013 | Mosby et al. |
| 8,378,974 B2 | 2/2013 | Aroyan et al. |
| 8,392,486 B2 | 3/2013 | Ing |
| 8,427,423 B2 | 4/2013 | Tsumura |
| 8,436,806 B2 | 5/2013 | Almalki et al. |
| 8,436,808 B2 | 5/2013 | Chapman et al. |
| 8,493,332 B2 | 7/2013 | D'Souza |
| 8,576,202 B2 | 11/2013 | Tanaka et al. |
| 8,619,063 B2 | 12/2013 | Chaine et al. |
| 8,638,318 B2 | 1/2014 | Gao et al. |
| 8,648,815 B2 | 2/2014 | Kent et al. |
| 8,659,579 B2 | 2/2014 | Nadjar et al. |
| 8,670,290 B2 | 3/2014 | Aklil et al. |
| 8,681,128 B2 | 3/2014 | Scharff et al. |
| 8,692,809 B2 | 4/2014 | D'Souza |
| 8,692,810 B2 | 4/2014 | Ing |
| 8,692,812 B2 | 4/2014 | Hecht |
| 8,730,213 B2 | 5/2014 | D'souza et al. |
| 8,749,517 B2 | 6/2014 | Aklil |
| 8,823,685 B2 | 9/2014 | Scharff et al. |
| 8,854,339 B2 | 10/2014 | Kent et al. |
| 8,890,852 B2 | 11/2014 | Aroyan et al. |
| 8,896,429 B2 | 11/2014 | Chaine |
| 8,896,564 B2 | 11/2014 | Scharff et al. |
| 8,917,249 B1 * | 12/2014 | Buuck .................. G06F 3/0418 345/173 |
| 8,941,624 B2 | 1/2015 | Kent et al. |
| 8,946,973 B2 | 2/2015 | Pelletier |
| 8,994,696 B2 | 3/2015 | Berget et al. |
| 9,030,436 B2 | 5/2015 | Ikeda |
| 9,046,959 B2 | 6/2015 | Schevin et al. |
| 9,046,966 B2 | 6/2015 | D'Souza |
| 9,058,071 B2 | 6/2015 | Esteve |
| 2001/0050677 A1 | 12/2001 | Tosaya |
| 2002/0185981 A1 | 12/2002 | Dietz et al. |
| 2003/0197691 A1 | 10/2003 | Fujiwara et al. |
| 2003/0206162 A1 | 11/2003 | Roberts |
| 2004/0133366 A1 | 7/2004 | Sullivan |
| 2004/0160421 A1 | 8/2004 | Sullivan |
| 2004/0183788 A1 | 9/2004 | Kurashima et al. |
| 2004/0239649 A1 | 12/2004 | Ludtke |
| 2004/0246239 A1 | 12/2004 | Knowles et al. |
| 2006/0071912 A1 | 4/2006 | Hill et al. |
| 2006/0139340 A1 | 6/2006 | Geaghan |
| 2006/0166681 A1 | 7/2006 | Lohbihler |
| 2006/0262104 A1 | 11/2006 | Sullivan et al. |
| 2007/0109274 A1 | 5/2007 | Reynolds |
| 2007/0165009 A1 | 7/2007 | Sakurai et al. |
| 2007/0171212 A1 | 7/2007 | Sakurai et al. |
| 2007/0211022 A1 | 9/2007 | Boillot |
| 2007/0229479 A1 | 10/2007 | Choo et al. |
| 2007/0279398 A1 | 12/2007 | Tsumura et al. |
| 2008/0018618 A1 | 1/2008 | Hill et al. |
| 2008/0030479 A1 | 2/2008 | Lowles et al. |
| 2008/0081671 A1 * | 4/2008 | Wang et al. ............. 455/562.1 |
| 2008/0105470 A1 | 5/2008 | Van De Ven et al. |
| 2008/0111788 A1 | 5/2008 | Rosenberg et al. |
| 2008/0174565 A1 | 7/2008 | Chang et al. |
| 2008/0198145 A1 | 8/2008 | Knowles et al. |
| 2008/0231612 A1 | 9/2008 | Hill et al. |
| 2008/0284755 A1 | 11/2008 | Hardie-Bick |
| 2009/0103853 A1 | 4/2009 | Daniel |
| 2009/0146533 A1 | 6/2009 | Leskinen et al. |
| 2009/0160728 A1 | 6/2009 | Emrick et al. |
| 2009/0167704 A1 | 7/2009 | Terlizzi |
| 2009/0237372 A1 | 9/2009 | Kim et al. |
| 2009/0271004 A1 * | 10/2009 | Zecchin ................ G05B 15/02 700/13 |
| 2009/0273583 A1 | 11/2009 | Norhammar |
| 2009/0315848 A1 * | 12/2009 | Ku ...................... G06F 3/0416 345/173 |
| 2010/0026667 A1 * | 2/2010 | Bernstein ............ G06F 3/0436 345/177 |
| 2010/0045635 A1 | 2/2010 | Soo |
| 2010/0079264 A1 * | 4/2010 | Hoellwarth ............ G06F 3/041 340/407.2 |
| 2010/0117993 A1 | 5/2010 | Kent |
| 2010/0156818 A1 | 6/2010 | Burrough et al. |
| 2010/0188356 A1 | 7/2010 | Vu et al. |
| 2010/0245265 A1 | 9/2010 | Sato et al. |
| 2010/0277431 A1 | 11/2010 | Klinghult |
| 2010/0315373 A1 | 12/2010 | Steinhauser et al. |
| 2010/0321312 A1 | 12/2010 | Han et al. |
| 2010/0321325 A1 | 12/2010 | Springer et al. |
| 2010/0321337 A1 | 12/2010 | Liao et al. |
| 2011/0012717 A1 | 1/2011 | Pance et al. |
| 2011/0018695 A1 | 1/2011 | Bells et al. |
| 2011/0042152 A1 | 2/2011 | Wu |
| 2011/0057903 A1 | 3/2011 | Yamano et al. |
| 2011/0063228 A1 | 3/2011 | St. Pierre et al. |
| 2011/0080350 A1 | 4/2011 | Almalki et al. |
| 2011/0084912 A1 | 4/2011 | Almalki |
| 2011/0156967 A1 | 6/2011 | Oh et al. |
| 2011/0167391 A1 | 7/2011 | Momeyer et al. |
| 2011/0199342 A1 | 8/2011 | Vartanian et al. |
| 2011/0260990 A1 * | 10/2011 | Ali ........................ G06F 3/016 345/173 |
| 2011/0298670 A1 | 12/2011 | Jung et al. |
| 2012/0001875 A1 | 1/2012 | Li et al. |
| 2012/0026114 A1 * | 2/2012 | Lee ........................ G06F 3/016 345/173 |
| 2012/0050230 A1 * | 3/2012 | Harris ................... G06F 3/0433 345/178 |
| 2012/0062564 A1 | 3/2012 | Miyashita et al. |
| 2012/0068939 A1 | 3/2012 | Pemberton-Pigott |
| 2012/0081337 A1 | 4/2012 | Camp et al. |
| 2012/0088548 A1 | 4/2012 | Yun et al. |
| 2012/0120031 A1 | 5/2012 | Thuillier |
| 2012/0126962 A1 | 5/2012 | Ujii et al. |

(56) References Cited

U.S. PATENT DOCUMENTS

| | | | | |
|---|---|---|---|---|
| 2012/0127088 A1* | 5/2012 | Pance | .................... | G06F 3/016 345/173 |
| 2012/0188889 A1* | 7/2012 | Sambhwani | ......... | H04B 7/0404 370/252 |
| 2012/0194466 A1* | 8/2012 | Posamentier | ........... | G06F 3/041 345/174 |
| 2012/0200517 A1 | 8/2012 | Nikolovski | | |
| 2012/0229407 A1* | 9/2012 | Harris | .................. | G06F 3/0433 345/173 |
| 2012/0232834 A1* | 9/2012 | Roche | ................ | A61B 19/5244 702/150 |
| 2012/0272089 A1* | 10/2012 | Hatfield | .............. | G06F 13/4291 713/501 |
| 2013/0059532 A1 | 3/2013 | Mahanfar et al. | | |
| 2013/0249831 A1* | 9/2013 | Harris | ..................... | G06F 3/016 345/173 |
| 2014/0185834 A1 | 7/2014 | Fromel et al. | | |

FOREIGN PATENT DOCUMENTS

| | | |
|---|---|---|
| KR | 1020040017272 | 2/2004 |
| KR | 1020070005580 | 1/2007 |
| KR | 1020080005990 | 1/2008 |
| WO | 2006115947 A2 | 11/2006 |
| WO | 2006115947 A3 | 11/2006 |
| WO | 2011010037 A1 | 1/2011 |
| WO | 2011024434 A1 | 3/2011 |
| WO | 2011048433 A1 | 4/2011 |
| WO | 2011051722 | 5/2011 |

\* cited by examiner # LOCALIZED HAPTIC FEEDBACK

CROSS REFERENCE TO OTHER APPLICATIONS

This application claims priority to U.S. Provisional Patent Application No. 61/561,678 entitled A METHOD AND APPARATUS FOR GENERATING LOCALIZED HAPTIC FEEDBACK WITHOUT A CO-LOCATED ACTUATOR filed Nov. 18, 2011 which is incorporated herein by reference for all purposes.

BACKGROUND OF THE INVENTION

Various technologies have been used to provide a haptic feedback on a device. One of the most common technologies used to provide haptic feedback is a spinning motor with an off-center weight that vibrates the entire device when haptic feedback is desired. In touchscreen devices, this technology has been used to recreate the sensation of pushing a physical button/key. For example, when a user touches a button displayed on a touchscreen display of a device, the entire device is vibrated by spinning the motor for a brief period. However, this technology does not allow a localized haptic feedback to be created on the touchscreen display. For example, it is desirable to be able to tangibly feel the location of a displayed button within the touchscreen surface before selecting the button. Part of the challenge of creating a haptic feedback on a portion of the touchscreen rather than the entire device is the difficulty of placing a grid of tiny physical vibration sources on the screen in a manner that is efficient, durable and cost effective. Therefore, there exists a need for a better way to create localized haptic feedback on a surface.

BRIEF DESCRIPTION OF THE DRAWINGS

Various embodiments of the invention are disclosed in the following detailed description and the accompanying drawings.

DETAILED DESCRIPTION

Figure 1:
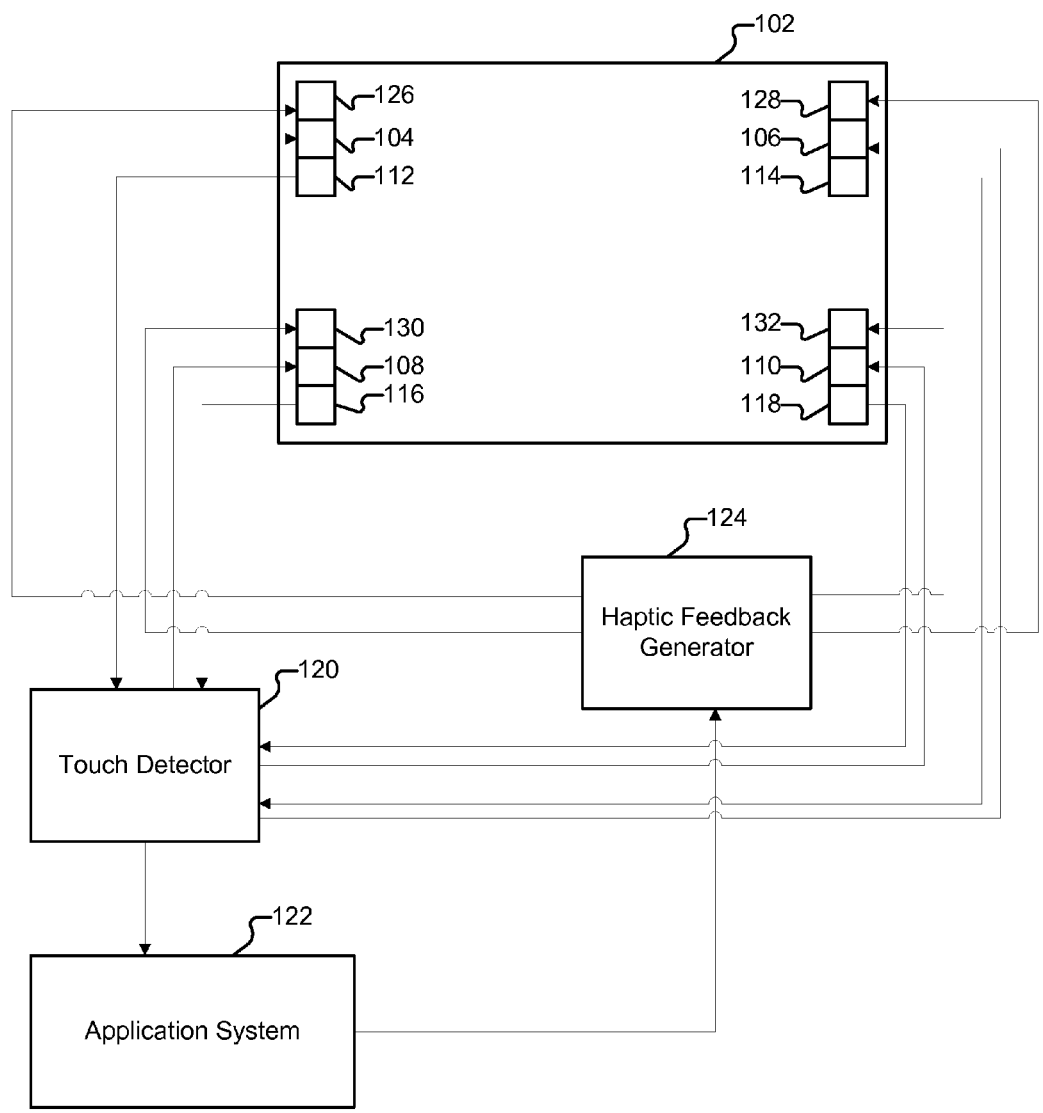
FIG. 1 is a block diagram illustrating an embodiment of a system for detecting a touch input surface disturbance and generating a localized tactile surface disturbance.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Generating a localized disturbance to create localized haptic feedback is disclosed. In some embodiments, utilizing haptic feedback includes a utilization of a sense of touch to provide information to a user. For example, a vibration may be used in a user interface to confirm a user action or assist a user in locating an object displayed on a screen. In some embodiments, a plurality of transducers is coupled to a medium of a surface such as a touchscreen surface. A signal generator generates a signal for each transducer. The signals constructively/coherently interfere at a location of interest on the surface such that a localized disturbance is generated at the location of interest. For example, the localized disturbance causes a localized vibration on the surface that can be felt by a user when the user touches the surface on the location of the localized disturbance. The localized disturbance may be substantially isolated to the location of interest. For example, a tactile feedback is only felt by a user on an isolated portion of the surface where the localized disturbance has been generated. In some embodiments, the localized disturbance may be used to allow a user to tactilely feel an isolated location on a touchscreen display surface where a button/key (e.g., keys of a keyboard) has been displayed.

Detecting disturbance on a surface is disclosed. For example, a user touch input on the glass surface of a display screen is detected. In some embodiments, a signal such as an acoustic or ultrasonic signal is propagated freely through a propagating medium with a surface using a transmitter coupled to the medium. When the surface is touched, the propagated signal is disturbed (e.g., the touch causes an interference with the propagated signal). In some embodiments, the disturbed signal is received at a sensor coupled to the propagating medium. By processing the received signal and comparing it against an expected signal without the disturbance, a location on the surface associated with the touch input is at least in part determined. For example, the disturbed signal is received at a plurality of sensors and a relative time difference between when the disturbed signal was received at different sensors is used to determine the location on the surface. In various embodiments, the touch includes a physical contact and/or close proximity (e.g., hovering) to a surface using a human finger, pen, pointer, stylus, and/or any other body part or object that can be used to contact or disturb the surface. In some embodiments, the touch includes an input gesture and/or a multi-touch input.

In some embodiments, the disturbed signal is used to determine one or more of the following associated with a touch input: a gesture, a coordinate position, a time, a time frame, a direction, a velocity, a force magnitude, a proximity magnitude, a pressure, a size, and other measurable or derived parameters. In some embodiments, by detecting disturbances of a freely propagated signal, touch input detection technology can be applied to larger surface regions with less or no additional cost due to a larger surface region as compared to certain previous touch detection technologies. Additionally, the optical transparency of a touch screen may not have to be affected as compared to resistive and capacitive touch technologies. Merely by way of example, the touch detection described herein can be applied to a variety of objects such as a kiosk, an ATM, a computing device, an entertainment device, a digital signage apparatus, a cell phone, a tablet computer, a point of sale terminal, a food and restaurant apparatus, a gaming device, a casino game and application, a piece of furniture, a vehicle, an industrial application, a financial application, a medical device, an appliance, and any other object or device having surfaces.

FIG. 1 is a block diagram illustrating an embodiment of a system for detecting a touch input surface disturbance and generating a localized tactile surface disturbance. In some embodiments, the system shown in FIG. 1 is included in a kiosk, an ATM, a computing device, an entertainment device, a digital signage apparatus, a cell phone, a tablet computer, a point of sale terminal, a food and restaurant apparatus, a gaming device, a casino game and application, a piece of furniture, a vehicle, an industrial application, a financial application, a medical device, an appliance, and any other object or device having surfaces. Propagating signal medium 102 is coupled to touch detection signal transmitters 104, 106, 108, and 110, haptic feedback signal transmitters 126, 128, 130, and 132, and sensors 112, 114, 116, and 118. In various embodiments, the propagating medium includes one or more of the following: panel, table, glass, screen, door, floor, whiteboard, glass, plastic, wood, steel, metal, semiconductor, insulator, conductor, and any medium that is able to propagate an acoustic or ultrasonic signal. For example, medium 102 is glass of a display screen. In some embodiments, medium 102 includes a surface where a user may touch to provide a selection input and a substantially opposite surface of medium 102 is coupled to the transmitters and sensors shown in FIG. 1. In some embodiments, medium 102 includes a surface where a user may receive haptic feedback and a substantially opposite surface of medium 102 is coupled to the transmitters and sensors shown in FIG. 1. In various embodiments, a surface of medium 102 is substantially flat, curved, or combinations thereof and may be configured in a variety of shapes such as rectangular, square, oval, circular, trapezoidal, annular, or any combination of these, and the like.

Examples of transmitters 104, 106, 108, 110, 126, 128, 130, and 132 include piezoelectric transducers, electromagnetic transducers, transmitters, sensors and/or any other transmitters and transducers capable of propagating a signal through medium 102. In some embodiments, touch detection signal transmitters 104, 106, 108, and 110 may be of a different type of transmitter as compared to haptic feedback signal transmitters 126, 128, 130, and 132. For example, the touch detection signal transmitters are configured to transmit a different signal frequency range as compared to haptic feedback signal transmitters 126, 128, 130, and 132. Examples of sensors 112, 114, 116, and 118 include piezoelectric transducers, electromagnetic transducers, transmitters and/or any other sensors and transducers capable of detecting a signal on medium 102. In some embodiments, at least a portion of the transmitters and sensors shown in FIG. 1 are coupled to medium 102 in a manner that allows a user input to be detected and/or haptic feedback to be received in a predetermined region of medium 102. Although four touch detection signal transmitters, four haptic feedback signal transmitters, and four sensors are shown, any number of transmitters and any number of sensors may be used in other embodiments. For example, two touch detection signal transmitters, three sensors, and five haptic feedback signal transmitters may be used. In some embodiments, a single transducer acts as more than one of the following: a touch detection signal transmitter, a haptic feedback signal transmitter and a sensor. For example, touch detection signal transmitter 104 and sensor 112 represent a single physical transducer. In another example, touch detection signal transmitter 104 and haptic feedback signal transmitter 126 represent a single physical transducer. In another example, haptic feedback signal transmitter 126, and sensor 112 represent a single physical transducer. In another example, touch detection signal transmitter 104, haptic feedback signal transmitter 126 and sensor 112 represent a single physical transducer. The example of FIG. 1 shows a haptic feedback signal transmitter, a touch detection signal transmitter, and a receiver that are clustered as a group. In some embodiments, one or more of the haptic feedback signal transmitters, touch detection signal transmitters, and sensors are not clustered together. For example, a haptic feedback signal transmitter is located at a location remote from any touch detection single transmitter.

In the example shown, touch detection signal transmitter 104 may propagate a signal through medium 102. Sensors 112, 114, 116, and 118 receive the propagated signal. In some embodiments, one or more of sensors 112, 114, 116, and 118 are used to configure one or more haptic feedback signal transmitters 126, 128, 130, and 132. In some embodiments, one or more of haptic feedback signal transmitters 126, 128, 130, and 132 are used as sensors to configure one or more of the touch detection signal transmitters. In some embodiments, one or more additional sensors not shown in FIG. 1 are used to configure one or more of the haptic feedback signal transmitters. For example, sensors shown in FIG. 1 are sensors configured to receive touch detection signals and different sensors that are configured to receive haptic feedback associated signals are located next to the haptic feedback signal transmitters shown in FIG. 1 and are used to configure the haptic feedback signal transmitters. In some embodiments, the transmitters/sensors in FIG. 1 are attached to a flexible cable coupled to medium 102 via an encapsulant and/or glue material and/or fasteners.

Touch detector 120 is connected to the touch detection signal transmitters and sensors shown in FIG. 1. In some embodiments, detector 120 includes one or more of the following: an integrated circuit chip, a printed circuit board, a processor, and other electrical components and connectors. Detector 120 determines and sends a signal to be propagated by transmitters 104, 106, 108, and 110. Detector 120 also receives the signal detected by sensors 112, 114, 116, and 118. The received signals are processed by detector 120 to determine whether a disturbance associated with a user input has been detected at a location on a surface of medium 102 associated with the disturbance. Detector 120 is in communication with application system 122. Application system 122 uses information provided by detector 120. For example, application system 122 receives from detector 120 a coordinate associated with a user touch input that is used by application system 122 to control a software application of application system 122. In some embodiments, application system 122 includes a processor and/or memory/storage. In other embodiments, detector 120 and application system 122 are at least in part included/processed in a single processor. An example of data provided by detector 120 to application system 122 includes one or more of the following associated with a user indication: a location coordinate of a surface of medium 102, a gesture, simultaneous user indications (e.g., multi-touch input), a time, a status, a direction, a velocity, a force magnitude, a proximity magnitude, a pressure, a size, and other measurable or derived information.

Haptic feedback generator 124 is connected to haptic feedback signal transmitters 126, 128, 130, and 132. In some embodiments, haptic feedback generator 124 is connected to sensors 112, 114, 116, and 118. In some embodiments, haptic feedback generator 124 includes one or more of the following: an integrated circuit chip, a printed circuit board, a processor, and other electrical components and connectors. In some embodiments, haptic feedback generator 124 and touch detector 120 are included in the same integrated circuit chip, printed circuit board, and/or other electrical packaging. Haptic feedback generator 124 determines and sends signals to be sent by haptic feedback signal transmitters 126, 128, 130, and 132. In some embodiments, application system 122 provides one or more locations on medium 102 where a haptic feedback should be provided. For example, application system 122 provides to generator 124 one or more coordinates referencing locations on a surface of medium 102 where haptic feedback is desired. In some embodiments, application system 122 provides an intensity, a length, a type, and/or a pattern associated with one or more locations where a haptic feedback is to be provided. In some embodiments, in response to a received location on medium 102 where haptic feedback is to be provided, haptic feedback generator 124 determines and sends haptic feedback signals (e.g., bending waves) to be propagated through medium 102 by haptic feedback signal transmitters 126, 128, 130, and 132.

The sent haptic feedback signals constructively interfere at the received location on medium 102 such that a localized disturbance is generated at the location. For example, the localized disturbance causes a localized vibration on the surface that can be felt by a user when the user touches the surface on the location of the localized disturbance. The localized disturbance may be substantially isolated to the location of interest. For example, although a haptic feedback signal (e.g., bending wave) propagated through medium 102 disturbs the entire medium, the effect of a single haptic feedback single on the medium is too minor to be detected by most users. As multiple haptic feedback signals are propagated through medium 102 by multiple haptic feedback signal transmitters, the haptic feedback signals all meet at a location on medium 102 where the signals constructively interfere with each other to generate a relatively large and localized disturbance that can be felt by a user.

In some embodiments, by varying the phase and/or amplitude of the haptic feedback signals sent by different haptic feedback signal transmitters, the location of the interference may be controlled. In some embodiments, a type, a length, an intensity, and/or a pattern of haptic feedback signals sent by different haptic feedback signal transmitters may be varied to provide different haptic feedback. In some embodiments, haptic feedback generator 124 is calibrated using one or more received sensor inputs. For example, the signals to be sent by generator 124 are calibrated using test input sensed by one or more sensors. The test input may be the same test input used to calibrate touch detector 120 and/or a different test input (e.g., external vibration source placed on a test location of medium 102) specifically for haptic feedback signal calibration. In various embodiments, the information used to calibrate generator 124 is provided by one or more of the following: application system 122, touch detector 120, sensors 112, 114, 116 and 118, touch detection signal transmitters 104, 106, 108 and 110, and haptic feedback signal transmitters 126, 128, 130 and 132.

The components shown in FIG. 1 are merely exemplary. Although a select number of instances of components have been shown to simplify the diagram, any number of any of the components shown in FIG. 1 may exist. For example, additional transmitters and sensors may exist. Components not shown in FIG. 1 may also exist. Components shown in FIG. 1 may also not exist in some embodiments. The location and configuration of components shown in FIG. 1 are example locations and the components may be in other locations and/or configurations in various embodiments.

Figure 2:
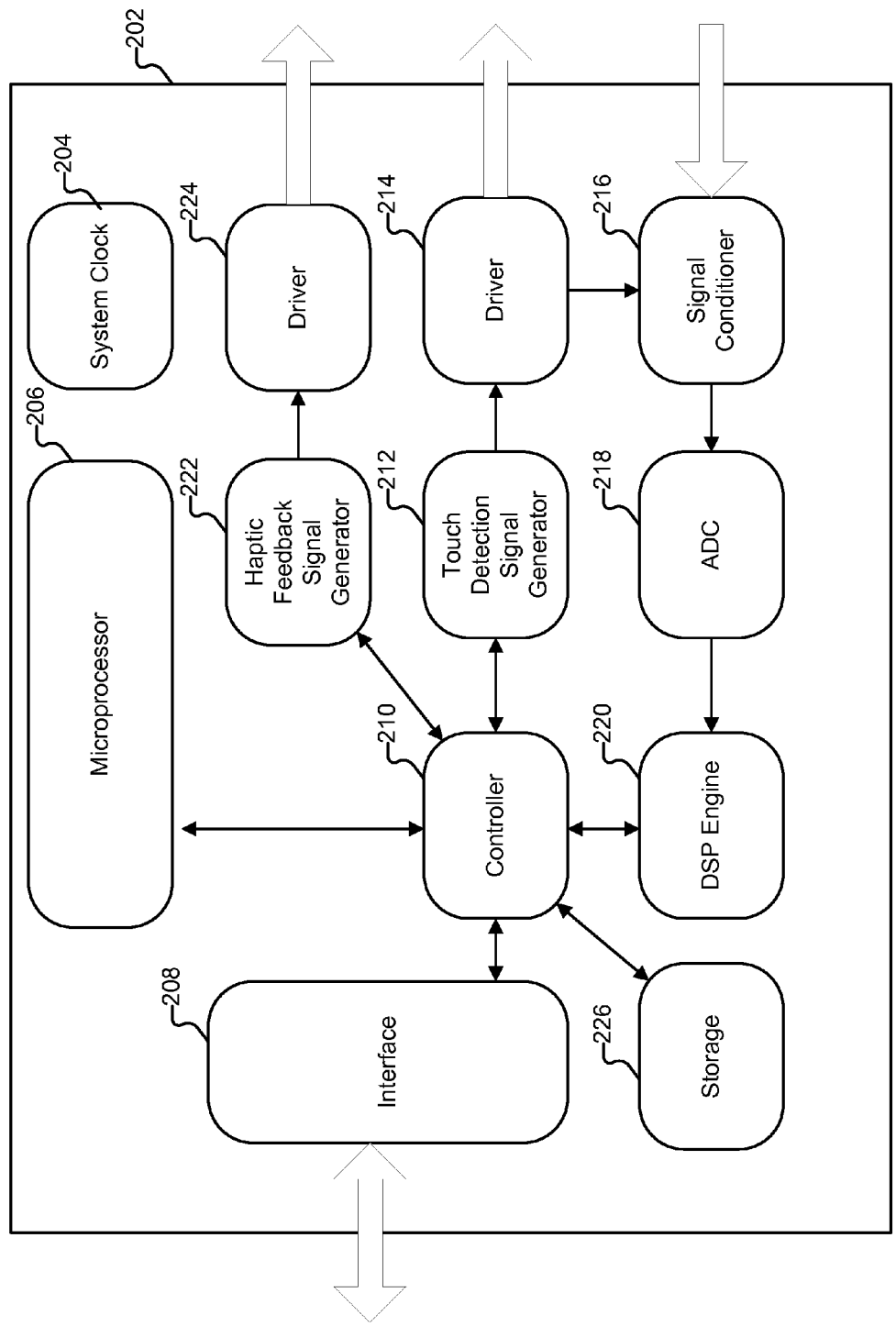
FIG. 2 is a block diagram illustrating an embodiment of a system for detecting a touch input and generating a haptic feedback signal.

FIG. 2 is a block diagram illustrating an embodiment of a system for detecting a touch input and generating a haptic feedback signal. In some embodiments, system 202 includes touch detector 120 of FIG. 1. In some embodiments, system 202 includes haptic feedback generator 124 of FIG. 1. In the example shown in FIG. 2, system 202 includes the ability to both detect touch input and generate haptic feedback single. In other embodiments, the system 202 does not include some of the components shown in FIG. 2. For example, system 202 is touch detector 120 of FIG. 1 and does not include one or more of components 222-226. In another example, system 202 is haptic feedback generator 124 of FIG. 1 and does not include one or more of components 212-220. In some embodiments, the system of FIG. 2 is integrated in an integrated circuit chip.

System 202 includes system clock 204 that provides a synchronous system time source to one or more other components of system 202. Controller 210 controls data flow and/or commands between microprocessor 206, interface 208, DSP engine 220, touch detection signal generator 212, haptic feedback signal generator 222, and storage 226. In some embodiments, microprocessor 206 processes instructions and/or calculations that can be used to program software/firmware and/or process data of system 202. In some embodiments, microprocessor 206 processes calculations required to generate haptic feedback signals generated by haptic feedback signal generator 222. In some embodiments, a memory is coupled to microprocessor 206 and is configured to provide microprocessor 206 with instructions. Touch detection signal generator 212 generates a signal to be used to propagate a signal such as a signal propagated by transmitter 104 of FIG. 1. For example, signal generator 212 generates a pseudorandom binary sequence signal. Driver 214 receives the signal from generator 212 and drives one or more transmitters, such as transmitters 104, 106, 108, and 110 of FIG. 1, to propagate a signal through a medium.

A signal detected from a sensor such as sensor 112 of FIG. 1 is received by system 202 and signal conditioner 216 conditions (e.g., filters) the received analog signal for further processing. For example, signal conditioner 216 receives the signal outputted by driver 214 and performs echo cancellation of the signal received by signal conditioner 216. The conditioned signal is converted to a digital signal by analog-to-digital converter 218. The converted signal is processed by digital signal processor engine 220. For example, DSP engine 220 correlates the converted signal against a reference signal. The result of the correlation may be used by microprocessor 206 to determine a location associated with a user touch input. Interface 208 provides an interface for microprocessor 206 and controller 210 that allows an external component to access and/or control system 202. For example, interface 208 allows system 202 to communicate with application system 122 of FIG. 1 and provides the application system with location information associated with a user touch input.

In some embodiments, interface 208 receives identifiers of one or more locations where a haptic feedback is desired. In some embodiments, interface 208 also receives a configuration of a type of haptic feedback to be provided. Based at least in part on the received information associated with the haptic feedback to be provided, haptic feedback signal generator 222 generates one or more signals (e.g., bending waves) that are to be propagated through a medium to provide localized haptic feedback at a specified location on the medium. Driver 224 receives signals from generator 222 and drives transmitters, such as transmitters 126, 128, 130 and 132 of FIG. 1, to propagate the haptic feedback signals through a medium that constructively interferes at a desired location to provide localized haptic feedback at the desired location. In some embodiments, multiple haptic feedback signals may be super imposed, added, and/or layered together to create haptic feedback at multiple locations at substantially the same time.

In some embodiments, haptic feedback signal generator 222 controls the location where haptic feedback is generated at least in part by individually controlling the phases and/or amplitudes of the haptic feedback signals driven by driver 224 to different haptic feedback signal transmitters. In some embodiments, one or more parameters/characteristics of one or more haptic feedback signals generated by haptic feedback signal generator 222 are obtained from storage 226. In some embodiments, storage 226 includes a table/database of signal parameters (e.g., signal phases or amplitudes) for each desired location where a haptic feedback is desired. For example, storage 226 includes predetermined data for each determined location on a surface of a medium, and for each determined location, storage 226 includes entries for signal phases and/or amplitudes to be utilized for each haptic feedback signal to be provided to each haptic feedback signal transmitter to create a haptic feedback at the determined location. In some embodiments, contents of storage 226 are predetermined and stored in storage 226. In some embodiments, at least a portion of data storage in storage 226 is computed by processor 206. In some embodiments, data contained in storage 226 is calibrated. For example, data in storage 226 is calibrated for manufacturing variation exhibited on a specific device. In some embodiments, processor 206 is used at least in part to calibrate data in storage 226 using one or more provided inputs (e.g., data received from sensors and/or other provided calibration data). In some embodiments, calibrating data in storage 226 includes modifying data stored in storage 226. In some embodiments, calibrating data in storage 226 includes determining one or more correction factors that can be applied to data obtained from storage 226. In some embodiments, storage 226 includes a formula and/or algorithm that can be used to compute a haptic feedback signal to be provided. In some embodiments, at least a portion of a haptic feedback signal generated by generator 222 is dynamically generated using a formula and/or an algorithm. In some embodiments, at least a portion of a haptic feedback signal generated by generator 222 is a predetermined signal obtained at least in part from storage 226.

Figure 3:
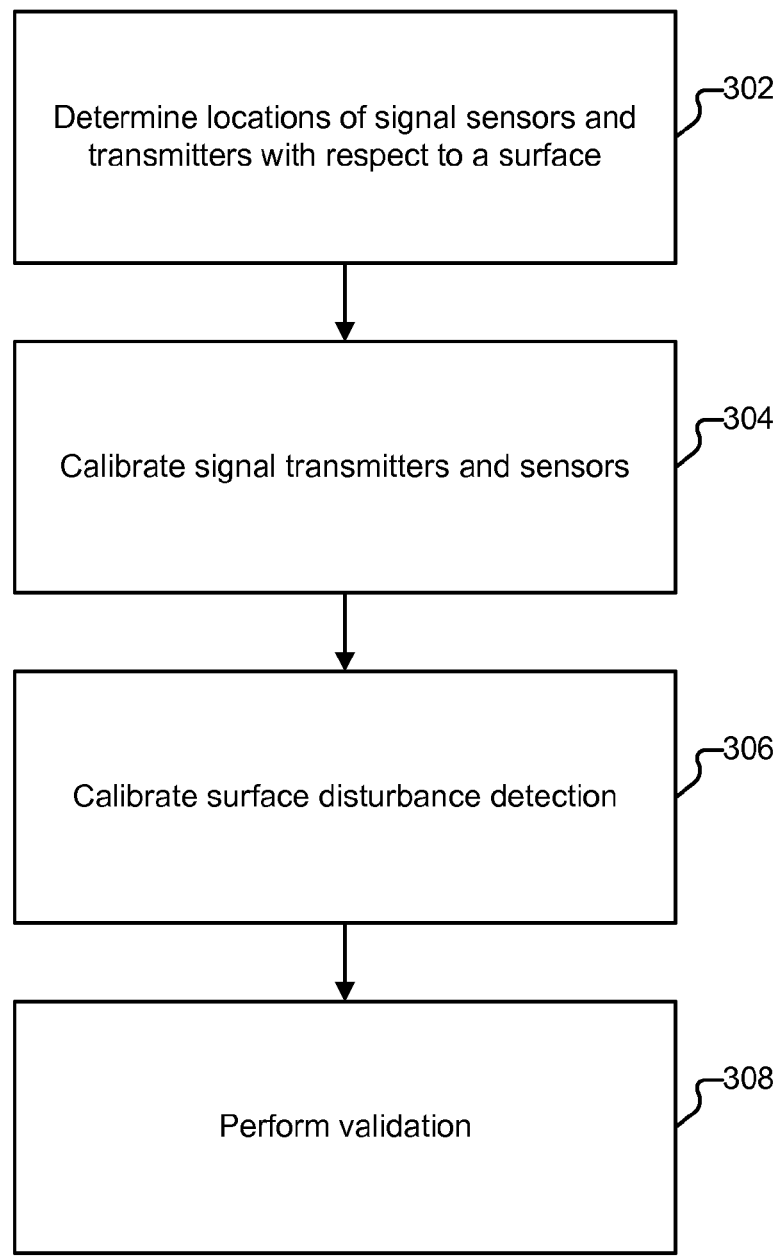
FIG. 3 is a flow chart illustrating an embodiment of a process for calibrating and validating touch detection.

FIG. 3 is a flow chart illustrating an embodiment of a process for calibrating and validating touch detection. In some embodiments, the process of FIG. 3 is used at least in part to calibrate and validate the system of FIG. 1 and/or the system of FIG. 2. At 302, locations of signal transmitters and sensors with respect to a surface are determined. For example, locations of transmitters and sensors shown in FIG. 1 are determined with respect to their location on a surface of medium 102. In some embodiments, determining the locations includes receiving location information. In various embodiments, one or more of the locations may be fixed and/or variable.

At 304, signal transmitters and sensors are calibrated. In some embodiments, calibrating the transmitter includes calibrating a characteristic of a signal driver and/or transmitter (e.g., strength). In some embodiments, calibrating the sensor includes calibrating a characteristic of a sensor (e.g., sensitivity). In some embodiments, the calibration of 304 is performed to optimize the coverage and improve signal to noise transmission/detection of a signal (e.g., acoustic or ultrasonic) to be propagated through a medium and/or a disturbance to be detected. For example, one or more components of the system of FIG. 1 and/or the system of FIG. 2 are tuned to meet a signal-to-noise requirement. In some embodiments, the calibration of 304 depends on the size and type of a transmission/propagation medium and geometric configuration of the transmitters/sensors. In some embodiments, the calibration of step 304 includes detecting a failure or aging of a transmitter or sensor. In some embodiments, the calibration of step 304 includes cycling the transmitter and/or receiver. For example, to increase the stability and reliability of a piezoelectric transmitter and/or receiver, a burn-in cycle is performed using a burn-in signal. In some embodiments, the step of 304 includes configuring at least one sensing device within a vicinity of a predetermined spatial region to capture an indication associated with a disturbance using the sensing device. The disturbance is caused in a selected portion of the input signal corresponding to a selection portion of the predetermined spatial region.

At 306, surface disturbance detection is calibrated. In some embodiments, a test signal is propagated through a medium such as medium 102 of FIG. 1 to determine an expected sensed signal when no disturbance has been applied. In some embodiments, a test signal is propagated through a medium to determine a sensed signal when one or more predetermined disturbances (e.g., predetermined touch) are applied at a predetermined location. Using the sensed signal, one or more components may be adjusted to calibrate the disturbance detection.

At 308, a validation of a touch detection system is performed. For example, the system of FIG. 1 and/or FIG. 2 is testing using predetermined disturbance patterns to determine detection accuracy, detection resolution, multi-touch detection, and/or response time. If the validation fails, the process of FIG. 3 may be at least in part repeated and/or one or more components may be adjusted before performing another validation.

Figure 4:
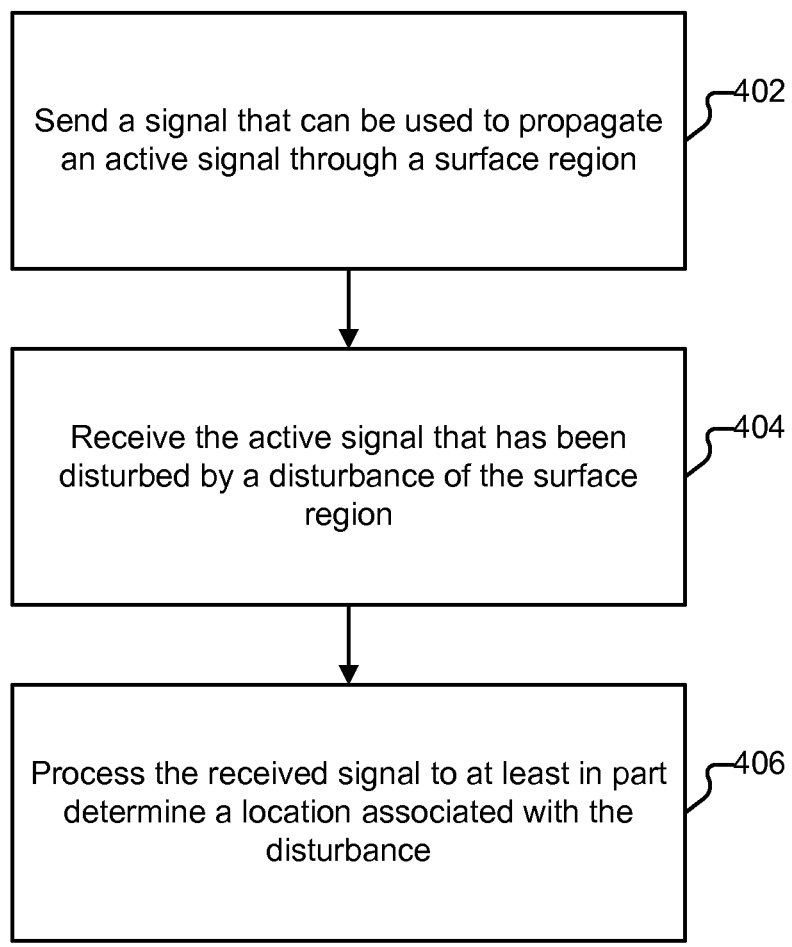
FIG. 4 is a flow chart illustrating an embodiment of a process for detecting a user touch input.

FIG. 4 is a flow chart illustrating an embodiment of a process for detecting a user touch input. In some embodiments, the process of FIG. 4 is at least in part implemented on touch detector 120 of FIG. 1 and/or touch system 202 of FIG. 2. At 402, a signal that can be used to propagate an active signal through a surface region is sent. In some embodiments, sending the signal includes driving (e.g., using driver 214 of FIG. 2) a transmitter such as a transducer (e.g., transmitter 104 of FIG. 1) to propagate an active signal (e.g., acoustic or ultrasonic) through a propagating medium with the surface region. In some embodiments, the signal includes a sequence selected to optimize autocorrelation (e.g., resulting in narrow/short peak) of the signal. For example, the signal includes a Zadoff-Chu sequence. In some embodiments, the signal includes a pseudorandom binary sequence with or without modulation. In some embodiments, the propagated signal is an acoustic signal. In some embodiments, the propagated signal is an ultrasonic signal (e.g., outside the range of human hearing). For example, the propagated signal is a signal above 20 kHz (e.g., within the range between 80 kHz to 100 kHz). In other embodiments, the propagated signal may be within the range of human hearing. In some embodiments, by using the active signal, a user input on or near the surface region can be detected by detecting disturbances in the active signal when it is received by a sensor on the propagating medium. By using an active signal rather than merely listening passively for a user touch indication on the surface, other vibrations and disturbances that are not likely associated with a user touch indication can be more easily discerned/filtered out. In some embodiments, the active signal is used in addition to receiving a passive signal from a user input to determine the user input.

At 404, the active signal that has been disturbed by a disturbance of the surface region is received. The disturbance may be associated with a user touch indication. In some embodiments, the disturbance causes the active signal that is propagating through a medium to be detracted, attenuated, and/or delayed. In some embodiments, the disturbance in a selected portion of the active signal corresponds to a location on the surface that has been indicated (e.g., touched) by a user.

At 406, the received signal is processed to at least in part determine a location associated with the disturbance. In some embodiments, determining the location includes extracting a desired signal from the received signal at least in part by removing or reducing undesired components of the received signal such as disturbances caused by extraneous noise and vibrations not useful in detecting a touch input. In some embodiments, determining the location includes comparing the received signal to a reference signal that has not been affected by the disturbance. The result of the comparison may be used with a result of other comparisons performed using the reference signal and other signal(s) received at a plurality of sensors. The location, in some embodiments, is a location (e.g., a location coordinate) on the surface region where a user has provided a touch input. In addition to determining the location, one or more of the following information associated with the disturbance may be determined at 406: a gesture, simultaneous user indications (e.g., multi-touch input), a time, a status, a direction, a velocity, a force magnitude, a proximity magnitude, a pressure, a size, and other measurable or derived information. In some embodiments, the location is not determined at 406 if a location cannot be determined using the received signal and/or the disturbance is determined to be not associated with a user input. Information determined at 406 may be provided and/or outputted.

Although FIG. 4 shows receiving and processing an active signal that has been disturbed, in some embodiments, a received signal has not been disturbed by a touch input and the received signal is processed to determine that a touch input has not been detected. An indication that a touch input has not been detected may be provided/outputted.

Figure 5:
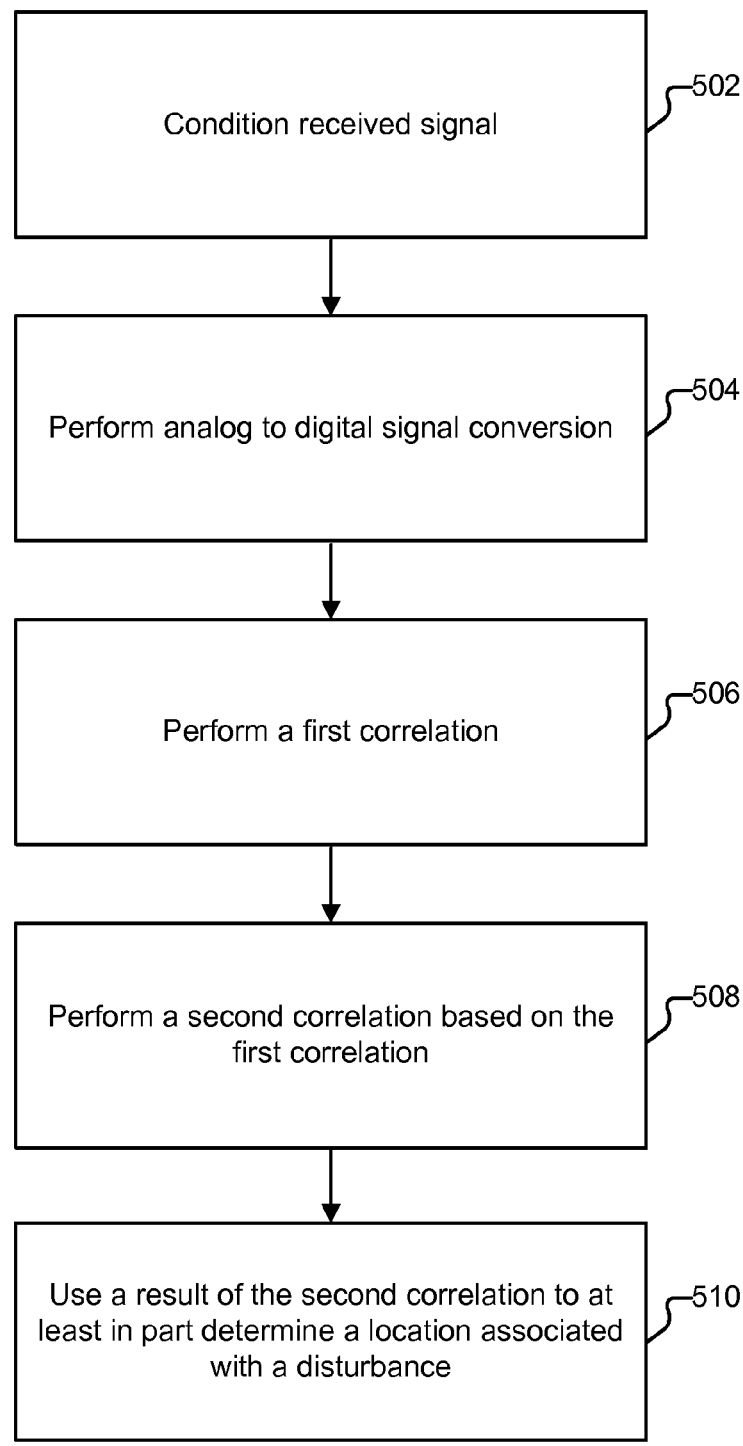
FIG. 5 is a flow chart illustrating an embodiment of a process for determining a location associated with a disturbance on a surface.

FIG. 5 is a flow chart illustrating an embodiment of a process for determining a location associated with a disturbance on a surface. In some embodiments, the process of FIG. 5 is included in 406 of FIG. 4. The process of FIG. 5 may be implemented in touch detector 120 of FIG. 1 and/or touch system 202 of FIG. 2. At 502, a received signal is conditioned. In some embodiments, the received signal is a signal including a pseudorandom binary sequence that has been freely propagated through a medium with a surface that can be used to receive a user input. For example, the received signal is the signal that has been received at 404 of FIG. 4. In some embodiments, conditioning the signal includes filtering or otherwise modifying the received signal to improve signal quality (e.g., signal to noise ratio) for detection of a pseudorandom binary sequence included in the received signal and/or user touch input. In some embodiments, conditioning the received signal includes filtering out from the signal extraneous noise and/or vibrations not likely associated with a user touch indication.

At 504, an analog to digital signal conversion is performed on the signal that has been conditioned at 502. In various embodiments, any number of standard analog to digital signal converters may be used. The resulting digital signal is used to perform a first correlation at 506. In some embodiments, performing the first correlation includes correlating the converted signal with a reference signal. Performing the correlation includes cross-correlating or determining a convolution (e.g., interferometry) of the converted signal with a reference signal to measure the similarity of the two signals as a time-lag is applied to one of the signals. By performing the correlation, the location of a portion of the converted signal that most corresponds to the reference signal can be located. For example, a result of the correlation can be plotted as a graph of time within the received and converted signal (e.g., time-lag between the signals) vs. a measure of similarity. The associated time value of the largest value of the measure of similarity corresponds to the location where the two signals most correspond. By comparing this measured time value against a reference time value (e.g., determined at 306 of FIG. 3) not associated with a touch indication disturbance, a time delay/offset or phase difference caused on the received signal due to a disturbance caused by a touch input can be determined. In some embodiments, by measuring the amplitude/intensity difference of the received signal at the determined time vs. a reference signal, a pressure of a touch indication may be determined. In some embodiments, the reference signal is determined based at least in part on the signal that was propagated through a medium (e.g., based on a source pseudorandom binary sequence signal that was propagated). In some embodiments, the reference signal is at least in part determined using information determined during calibration at 306 of FIG. 3. The reference signal may be chosen so that calculations required to be performed during the correlation may be simplified. For example, the reference signal used in 506 is a simplified reference signal that can be used to efficiently correlate the reference signal over a relatively large time difference (e.g., lag-time) between the received and converted signal and the reference signal.

At 508, a second correlation is performed based on a result of the first correlation. Performing the second correlation includes correlating (e.g., cross-correlation or convolution similar to step 506) the converted signal in 504 with a second reference signal. The second reference signal is a more complex/detailed (e.g., more computationally intensive) reference signal as compared to the first reference signal used in 506. In some embodiments, the second correlation is performed in 508 because using the second reference signal in 506 may be too computationally intensive for the time interval required to be correlated in 506. Performing the second correlation based on the result of the first correlation includes using one or more time values determined as a result of the first correlation. For example, using a result of the first correlation, a range of likely time values (e.g., time-lag) that most correlate between the received signal and the first reference signal is determined and the second correlation is performed using the second reference signal only across the determined range of time values to fine tune and determine the time value that most corresponds to where the second reference signal (and, by association, also the first reference signal) matched the received signal. In various embodiments, the first and second correlations have been used to determine a portion within the received signal that correspond to a disturbance caused by a touch input at a location on a surface of a propagating medium. In other embodiments, the second correlation is optional. For example, only a single correlation step is performed.

At 510, a result of the second correlation is used to at least in part determine a location associated with a disturbance. In some embodiments, determining the location includes comparing a determined time value where the signals of the second correlation are most correlated and comparing the determined time value with a reference time value (e.g., determined at 306 of FIG. 3) not associated with a touch input disturbance, to determine a time delay/offset or phase difference caused on the received signal due to the disturbance (e.g., caused by a touch input). This time delay is associated with a signal received at a first sensor and other time delays due to the disturbance at other signals received at other sensors are used to calculate a location of the disturbance relative to the locations of the sensors. By using the location of the sensors relative to a surface of a medium that has propagated the received signal, a location on the surface where the disturbance originated may be determined.

Figure 6:
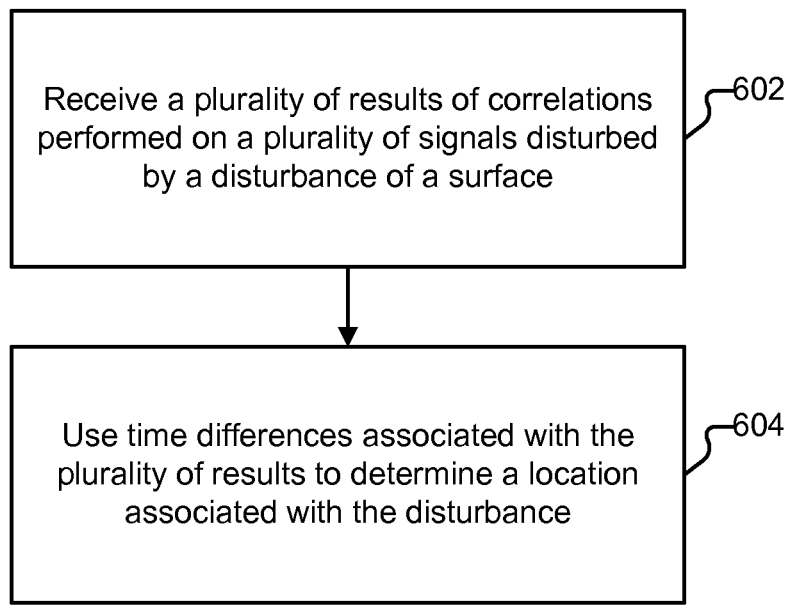
FIG. 6 is a flow chart illustrating an embodiment of a process for determining a location associated with a disturbance.

FIG. 6 is a flow chart illustrating an embodiment of a process for determining a location associated with a disturbance. In some embodiments, the process of FIG. 6 is included in 510 of FIG. 5. At 602, a plurality of results of correlations performed on a plurality of signals disturbed by a disturbance of a surface is received. For example, a result of the correlation performed at 508 of FIG. 5 is received. In some embodiments, a signal is propagated using transmitter 104 and sensors 114, 116, and 118 each receives the propagated signal that has been disturbed by a touch input on or near a surface of medium 102 of FIG. 1. The propagated signal may contain a predetermined signal and the predetermined signal is received at the various sensors. Each of the received signals is correlated with a reference signal to determine the results received at 602. In some embodiments, the received results are associated with a same signal content (e.g., same binary sequence) that has been freely propagated on a medium at the same time. In some embodiments, the received results are associated with different signal contents that have been disturbed by the same disturbance.

At 604, time differences associated with the plurality of results are used to determine a location associated with the disturbance. In some embodiments, each of the time differences is associated with a time when signals used in the correlation are most correlated. In some embodiments, the time differences are associated with a determined time delay/offset or phase difference caused on the received signal due to the disturbance. This time delay may be calculated by comparing a time value determined using a correlation with a reference time value that is associated with a scenario where a touch input has not been specified. The result of the comparison may be used to calculate a location of the disturbance relative to the locations of sensors that received the plurality of signals. By using the location of the sensors relative to a surface of a medium that has propagated the received signal, a location on the surface where the disturbance originated may be determined.

Figure 7:
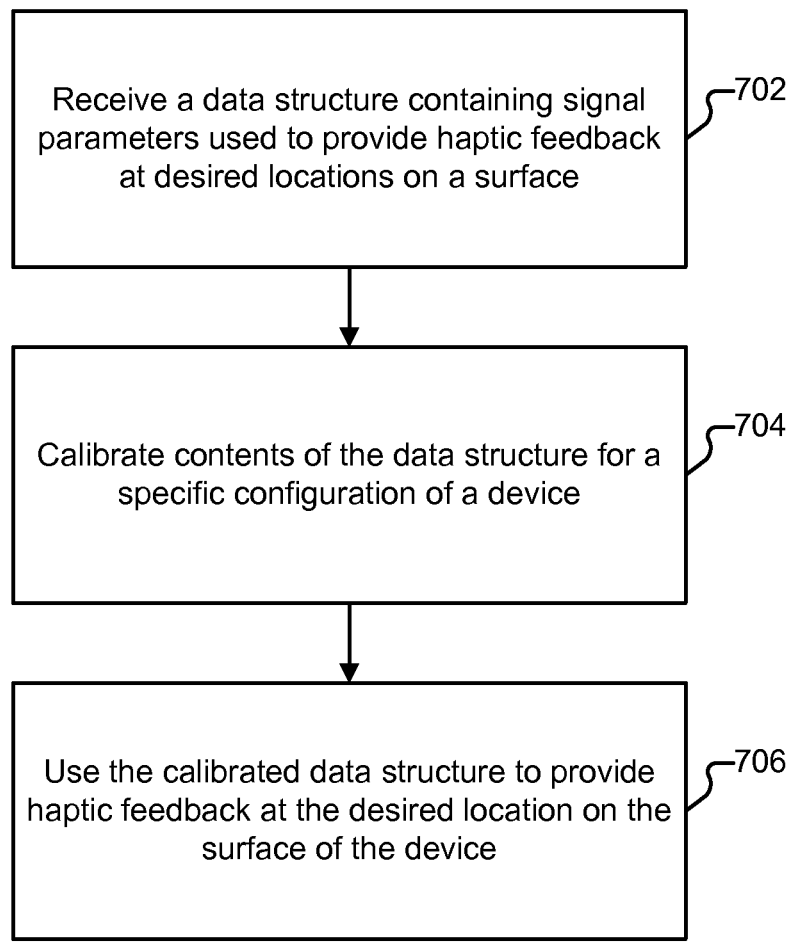
FIG. 7 is a flow chart illustrating an embodiment of a process for providing haptic feedback at a desired location.

FIG. 7 is a flowchart illustrating an embodiment of a process for providing haptic feedback at a desired location. In some embodiments, the process of FIG. 7 is at least in part implemented on haptic feedback generator 124 of FIG. 1 and/or system 202 of FIG. 2.

At 702, a data structure containing signal parameters used to provide haptic feedback at desired locations on a surface is received. In some embodiments, the data structure is stored in storage 226 of FIG. 2. Examples of the data structure include a table, a database, and a list. In some embodiments, the data structure includes predetermined data that can be used to generate haptic feedback signals (e.g., bending waves) that constructively interfere at a location to provide a localized haptic feedback at the location. Examples of data included in the table include recorded signals, signal parameters, and/or signal configurations that can be used to generate one or more haptic feedback signals. In some embodiments, the data structure includes data that is indexed and/or searchable based on an identifier of a location where a localized haptic feedback is desired. For example, the data structure is indexed based on a coordinate location of a surface where a localized haptic feedback can be provided and for each coordinate, the data structure includes signal configurations/parameters for each transmitter of a plurality of transmitters that can be used to provide a haptic feedback at the location of the coordinate. In one example, the data structure is searched to locate entries associated with a provided coordinate location where a haptic feedback is desired. The entries may include signal phases, signal frequencies, signal amplitudes, signal patterns, and/or recorded signals to be utilized for each haptic feedback signal to be provided to each haptic feedback signal transmitter to create a haptic feedback at a location of the provided coordinate location.

In some embodiments, at least a portion of the contents of the data structure has been predetermined. For example, contents of the data structure have been predetermined for a device to be manufactured and the data structured is to be stored in a plurality of same or similar manufactured devices. In some embodiments, the contents of the data structure have been determined for a specific device configuration. For example, contents of the data structure have been determined for a specific type/size/configuration of a touchscreen medium (e.g., touch surface glass) and a location/type/number/configuration of haptic feedback signal transmitters coupled to the touchscreen medium. In some embodiments, at least a portion of the contents of the data structure has been calculated. For example, formulas and/or simulations have been used to determine signal data for each location on a surface where a haptic feedback can be provided. One example calculation method includes a time of flight calculation/simulation. Another example calculation method includes beamforming/spatial filtering calculation/simulation.

In some embodiments, at least a portion of the contents of the data structure has been predetermined at least in part by physically stimulating a surface and measuring the effect of the stimulation. For example, a vibration source is applied to a stimulation location on a surface of a device and the effect of the vibration is measured at remote locations where haptic feedback transmitters are/will be located on the device. In some embodiments, the effect of the vibration is measured by the haptic feedback transmitters (e.g., haptic feedback transmitters are transducers capable of transmitting and receiving/detecting signals). By transmitting signals with characteristics of the measured effects at the remote locations with haptic feedback transmitters, conditions that existed when the vibration source was applied are recreated, and the vibration may be recreated at the stimulation location. In some embodiments, measuring the effect of the vibration includes recording the effects of the vibration. For example, detected signals at the haptic feedback transmitter locations are recorded. These recorded signals may be played back at the haptic feedback transmitter locations to recreate the effects of the applied vibration. The recreated effects of the applied vibration may be provided as a haptic feedback. In some embodiments, measuring the effect of the vibration includes recording signal characteristics such as phase, amplitude, and/or frequency at a plurality of locations remote from the vibration source. In some embodiments, a plurality of different types of physical stimulation areas applied to the same location and effects of the stimulations are stored. In some embodiments, the stimulation application and measurement are performed for a plurality of locations on a surface where haptic feedback may be desired and the measured data is used at least in part to generate the data structure of step 702.

At 704, contents of the data structure are calibrated for a specific configuration of a device. In some embodiments, contents of the data structure have been predetermined for a device to be manufactured and the data structured is stored in a manufactured device that may exhibit manufacturing variations. The manufacturing variations may require contents of the data structure to be calibrated before the contents are used to provide haptic feedback on the device. In some embodiments, calibrating the data structure includes using one or more provided inputs. For example, in response to a calibration test input, calibration data is received from one or more sensors such as sensors 112-118 and/or one or more transducers such as transmitters 104-110 or 126-132 of FIG. 1. In some embodiments, calibration data determined in step 302, 304, and/or 306 of FIG. 3 is received and used to calibrate contents of the data structure. For example, data used to calibrate touch detection (e.g., determined transducer location, propagating medium characteristic, etc.) is used to calibrate haptic feedback generation. In some embodiments, calibrating the contents includes modifying data stored in the data structure. In some embodiments, calibrating the contents includes determining one or more correction factors that can be applied to data stored in the data structure. In other embodiments, contents of the data structure do not have to be calibrated because the contents were originally generated for a specific configuration. In some embodiments, contents of the data structure are dynamically calibrated substantially when data is obtained from the data structure to generate a haptic feedback signal.

At 706, the calibrated data structure is used to provide haptic feedback at the desired location on the surface of the device. For example, one or more coordinates referencing location(s) on the surface of the device where haptic feedback is desired are received. The request for the haptic feedback may also include an intensity, a length, a type, and/or a pattern associated with one or more locations where haptic feedback is to be provided. In some embodiments, an identifier of the desired location of the haptic feedback is used to obtain signals, configurations, and/or characteristics associated with signals to be propagated through a medium of the surface to provide the desired haptic feedback. The propagated haptic feedback signals (e.g., bending waves) constructively interfere at the desired location on the surface such that a detectable localized disturbance is generated at the location. For example, the localized disturbance causes a localized vibration on the surface that can be felt by a user when the user touches the surface on the location of the localized disturbance. The localized disturbance may be substantially isolated to the location of interest. Haptic feedback may be provided on multiple locations of the surface by propagating a combined haptic feedback signal for the multiple locations.

Figure 8:
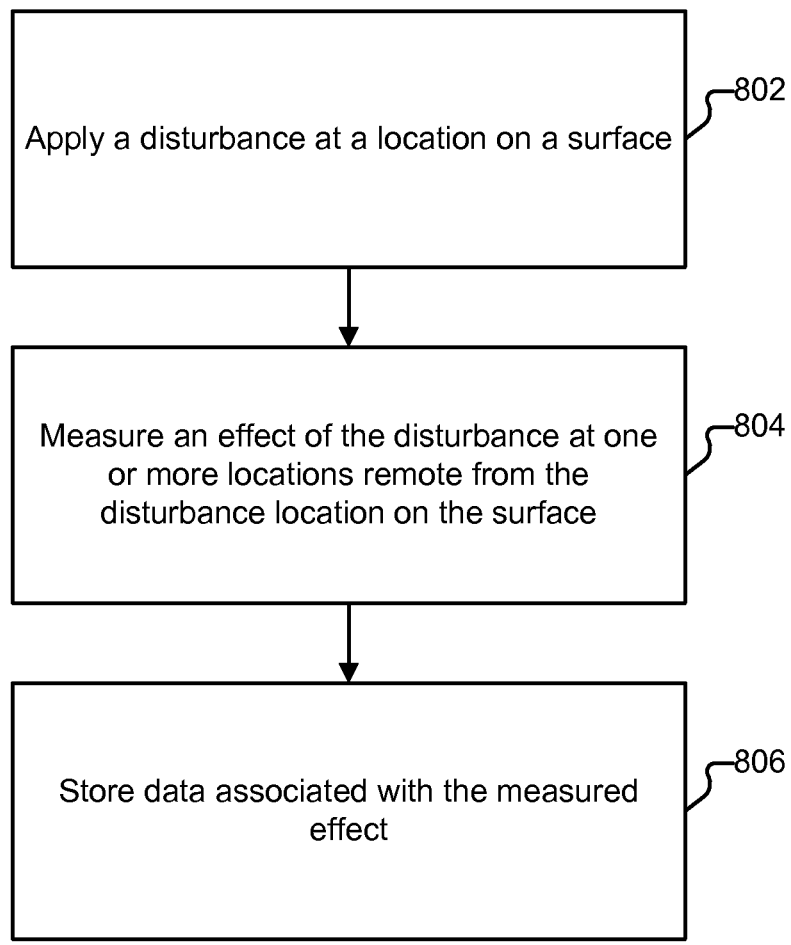
FIG. 8 is a flow chart illustrating an embodiment of a process for predetermining data that can be used to generate a haptic feedback signal.

FIG. 8 is a flowchart illustrating an embodiment of a process for predetermining data that can be used to generate a haptic feedback signal. In some embodiments, the process of FIG. 8 is used to generate the data structure received in step 702 of FIG. 7. The process of FIG. 8 may be at least in part implemented on haptic feedback generator 124 of FIG. 1 and/or system 202 of FIG. 2.

At 802, a disturbance is applied at a location on a surface. In some embodiments, the disturbance is provided on a location of a surface of medium 102 of FIG. 1 where a haptic feedback capability is desired. In some embodiments, the disturbance is provided by a transmitter that is touching the location on the surface. For example, a piezoelectric transducer transmitter (e.g., same type of transmitter as transmitter 126 of FIG. 1) mounted on a tip of a pointer is placed into the contact with the surface at the location. In some embodiments, the provided disturbance simulates a desired haptic feedback to be generated at the location. For example, the disturbance is created using a signal that is in the same frequency range as a range of a haptic feedback signal (e.g., a signal provided by transmitter 126 of FIG. 1) to be used to provide a haptic feedback on the surface. In some embodiments, the disturbance has been provided at the location on the surface to determine data that can be used to generate signals for remotely located transmitters (e.g., transmitters 126-132 of FIG. 1) to provide a haptic feedback at a desired location. The disturbance may be one of a plurality of disturbances that are successively applied at each location on the surface where a haptic feedback capability is desired to determine configurations/characteristics/parameters of haptic feedback signals to be utilized to provide the haptic feedback at the applicable location.

At 804, an effect of the disturbance is measured at one or more locations remote from the disturbance location on the surface. In some embodiments, the locations remote from the disturbance location are associated with locations where haptic feedback signal transmitters are/will be located. For example, the effect is measured at locations where transmitters 126-132 are located in FIG. 1. In some embodiments, the effect is measured using one or more sensors located at the locations remote from the disturbance location. Examples of the sensors include sensors 112-118 of FIG. 1 and transducer transmitters used as receivers (e.g., transmitters 126-132 and/or transmitters 104-110 of FIG. 1). In some embodiments, measuring the disturbance includes recording measured signals. In some embodiments, these recorded signals may be played back at the measurement locations to recreate the effects of the applied disturbance. In some embodiments, measuring the disturbance includes determining signal characteristics such as signal phase, amplitude, pattern, and/or frequency. In some embodiments, a plurality of different types of disturbances is applied at the same disturbance location and effects of the disturbances are measured at the remote locations.

At 806, data associated with the measured effect is stored in order to be used to provide a haptic feedback at the disturbance location. In some embodiments, storing the data includes storing an entry in a data structure such as the data structure received in step 702 of FIG. 2. In some embodiments, the data is stored in storage 226 of FIG. 2. In some embodiments, storing the data includes indexing the data by an identifier (e.g., coordinate location) of the disturbance location. For example, the stored data may be retrieved from the storage using the location identifier. In some embodiments, stored data includes data associated with a plurality of signals for a plurality of haptic feedback signal transmitters. In some embodiments, the stored data includes one or more of the following: a signal phase, signal frequency, a signal amplitude, a signal pattern, and a recorded signal. In some embodiments, stored data is used to generate haptic feedback signals that are propagated through a medium of a surface to cause localized constructive interference that is perceived by a user as localized haptic feedback at the constructive interference location.

Figure 9:
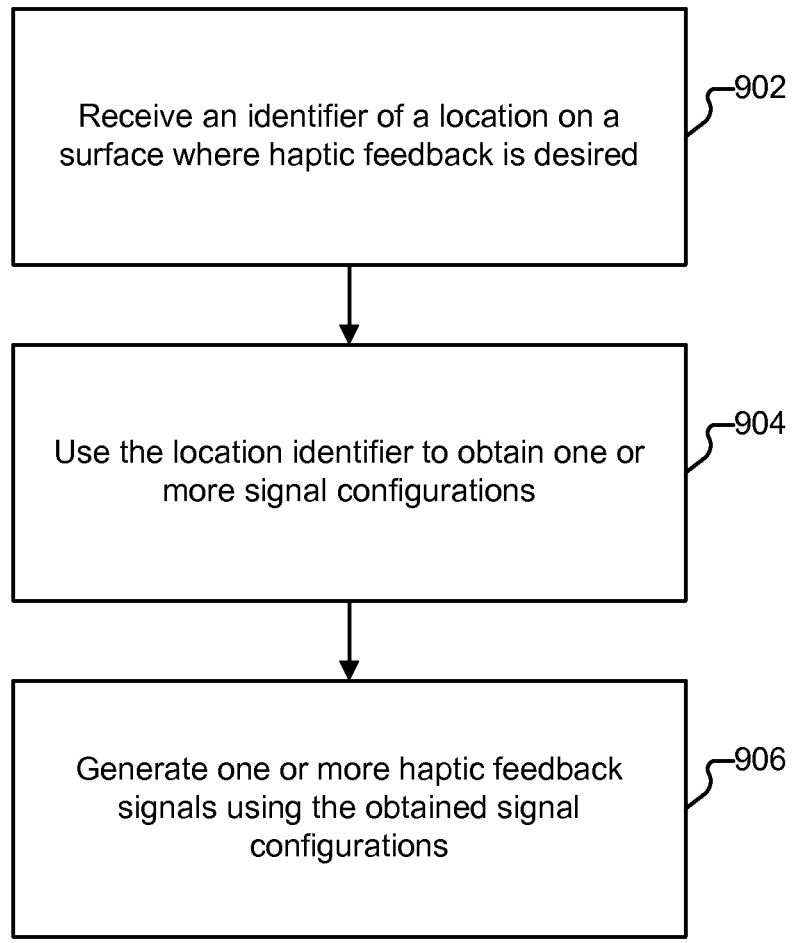
FIG. 9 is a flow chart illustrating an embodiment of a process for providing a haptic feedback.

FIG. 9 is a flowchart illustrating an embodiment of a process for providing a haptic feedback. In some embodiments, the process of FIG. 9 is used to generate the data structure received in step 702 of FIG. 7. The process of FIG. 9 may be at least in part implemented on haptic feedback generator 124 of FIG. 1 and/or system 202 of FIG. 2.

At 902, an identifier of a location on a surface where haptic feedback is desired is received. In some embodiments, the identifier is received from an application. In some embodiments, the identifier is received from an application system such as application system 122 of FIG. 1. In some embodiments, the identifier includes a coordinate location of the surface where haptic feedback is desired. In some embodiments, the identifier is one of a plurality of locations where haptic feedback is desired. In some embodiments, the identifier specifies an area on the surface where haptic feedback is desired. For example, a plurality of coordinate points that outline an area where haptic feedback is desired is received. In some embodiments, the location identifier is provided along with an identifier of an intensity, a length, a type, and/or a pattern associated with the location where a haptic feedback is to be provided.

At 904, the location identifier is used to obtain one or more signal configurations to be used to provide a haptic feedback. In some embodiments, the signal configurations may be used to generate one or more haptic feedback signals to be propagated by transmitters 126-132 of FIG. 1 to provide a haptic feedback. In some embodiments, the location identifier is used to locate data in a data structure such as the data structure received in step 702 of FIG. 7 and/or data stored in storage 226 of FIG. 2. For example, the obtained signal configurations include signal parameters/configurations/characteristics that can be used to generate haptic feedback signals to be propagated through a medium to provide haptic feedback. In some embodiments, the obtained signal configurations include a different signal phase and/or amplitude for each haptic feedback signal to be provided to each haptic feedback signal transmitter to provide the haptic feedback. In some embodiments, the obtained signal configurations include signal recordings. In some embodiments, the location identifier is used to determine one or more other identifiers that can be used to obtain the signal configurations. For example, the location identifier is translated into another location identifier compatible with a data structure storing the signal configurations (e.g., translation of one coordinate system to another coordinate system). In another example, the location identifier specifies an area and one or more location coordinates included in the area is determined and haptic feedback is provided at the determined location coordinates. In some embodiments, haptic feedback may only be provided at select locations on the surface and a select location that most closely matches the location identified by the received location identifier is determined to provide haptic feedback at the select location rather than the exact location of the received location identifier.

In some embodiments, the location identifier is used to obtain the one or more signal configurations at least in part by dynamically calculating the signal configurations. For example, formulas and/or simulations may be used to determine signal data for each haptic feedback transmitter coupled to the surface where a haptic feedback can be provided. Examples of the formula/simulation include a time of flight, beamforming, and/or a spatial filtering formula/simulation. In some embodiments, the signal configurations are obtained based at least in part on other provided information about a desired haptic feedback, such as an intensity, a length, a type, and/or a pattern associated with the location where a haptic feedback is to be provided. In some embodiments, the obtained signal configurations are calibrated/corrected before being utilized. For example, one or more calibration factors determined in step 702 of FIG. 7 is used to correct the obtained signal configurations.

At 906, one or more haptic feedback signals are generated using the obtained signal configurations. In some embodiments, generating the haptic feedback signals includes generating signals to be propagated by haptic feedback signal transmitters such as transmitters 126-132 of FIG. 1 to provide a haptic feedback. For example, the obtained configuration includes a signal frequency, amplitude, phase, and/or pattern for each signal to be propagated by each haptic feedback signal transmitter. In some embodiments, generating the haptic feedback signal includes playing a recorded signal included in the obtained signal configurations. In some embodiments, generating the haptic feedback signals includes dynamically generating a signal based on the obtained signal configurations. For example, formulas and/or simulations may be used to generate the signals. Examples of the formulas/simulations include a time of flight, beamforming, and/or spatial filtering formulas/simulation. In some embodiments, the haptic feedback signals are generated based at least in part on a provided specification about an intensity, a length, a type, and/or a pattern of the haptic feedback. For example, to vary the intensity of a haptic feedback, amplitude of a haptic feedback signal is varied. In some embodiments, the generated haptic feedback signal includes a sine wave. In some embodiments, the generated haptic feedback signal includes a pulse wave. In some embodiments, a fidelity of a haptic feedback (e.g., smallest area where a single haptic feedback can be isolated) is controlled at least in part by varying a frequency of the generated haptic feedback signal.

The generated haptic feedback signals (e.g., bending waves) are propagated through a medium of a surface and the signals constructively interfere at a desired location such that a localized disturbance is generated at the desired location. In some embodiments, a frequency of the haptic feedback signal is selected to not (or minimally) interfere with touch location detection described above. For example, touch detection signals are limited to a range of frequencies (e.g., ultrasonic frequency range) and the haptic feedback signals are limited to a different range (e.g., lower range) of frequencies (e.g., audible frequency range).

In some embodiments, the generated haptic feedback signals may be associated with a plurality of locations where haptic feedback is desired at the same time. In some embodiments, haptic feedback signal waveforms are individually determined for each desired location and the determined signal waveforms are combined (e.g., superimposed) to provide simultaneous haptic feedback at a plurality of locations. For example, the medium of the surface where simultaneous haptic feedbacks are desired exhibits linear signal propagating properties and for each haptic feedback signal transmitter of the medium, haptic feedback signal waveforms for different locations are combined into a single signal waveform. The combined signal waveforms from a plurality of transmitters cause constructive interferences at the multiple locations where haptic feedbacks are desired at the same time.

In some embodiments, the generated haptic feedback signals are used to provide haptic feedback on a mobile device. The mobile device may be powered by a battery and it may be desirable to efficiently utilize the power of the device. In some embodiments, the generated haptic feedback signals are used to provide haptic feedback based at least in part on a power state of a device. For example, an intensity, type, pattern, and/or length of a provided haptic feedback may depend on a power state (e.g., active, inactive, plugged in, battery level, processor power state, operating system power state, etc.). In another example, a haptic feedback may be disabled on certain power states. In some embodiments, the generated haptic feedback signals are used to provide haptic feedback based at least in part on received sensor data. For example, an intensity, type, pattern, and/or length of a provided haptic feedback may depend on data received from a proximity sensor, motion sensor, accelerometer, touch input detector, and/or gyroscope (e.g., indicating active user utilization of the device). In another example, a haptic feedback may be disabled if it is determined that a user has not interacted with the device (e.g., using sensor data) within a predetermined amount of time. In another example, a haptic feedback may be only enabled when it detected that an object (e.g., finger) is close enough to receive the haptic feedback.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A haptic feedback system including:
   a plurality of remote transmitters that are remote from a location of interest on a surface of the system, wherein the plurality of remote transmitters is included in the haptic feedback system but is not located at the location of interest;
   a signal generator that generates a haptic component signal for each of the remote transmitters, wherein the remote transmitters propagate the haptic component signals through a touch screen medium of the surface and the haptic component signals interfere at the location of interest such that a localized haptic disturbance is generated at the location of interest and the localized haptic disturbance is generated by an interference of the haptic component signals at the location of interest without a use of a motor and the interference of the haptic component signals that generated the localized haptic disturbance is substantially localized to the location of interest to generate the localized haptic disturbance that is substantially isolated to the location of interest; and
   an ultrasonic transmitter that transmits an ultrasonic touch location signal, wherein the ultrasonic touch location signal is allowed to freely propagate in multiple directions through the touch screen medium of the surface of the system, the ultrasonic touch location signal is utilized to detect a location of a touch input and the ultrasonic touch location signal is different from the haptic component signal.

2. The system of claim 1, wherein the signal generator controls the location of interest where the localized haptic disturbance is generated at least in part by controlling signal phases of the haptic component signals and generating the localized haptic disturbance includes generating a physical vibration.

3. The system of claim 1, wherein the signal generator controls the intensity of the localized haptic disturbance at least in part by controlling amplitudes of the haptic component signals.

4. The system of claim 1, wherein the localized haptic disturbance is associated with a haptic feedback.

5. The system of claim 1, wherein the localized haptic disturbance indicates a location of a button displayed on the surface.

6. The system of claim 1, wherein the surface is a touchscreen display surface.

7. The system of claim 1, wherein the plurality of remote transmitters includes transducers.

8. The system of claim 1, wherein the location of interest corresponds to a location identifier received from an application.

9. The system of claim 1, wherein the haptic component signals include bending waves.

10. The system of claim 1, wherein the localized haptic disturbance is isolated to the location of interest.

11. The system of claim 1, further comprising a storage that provides signal parameter data used by the signal generator to generate the haptic component signals.

12. The system of claim 11, wherein the storage includes predetermined data indexed by locations on the surface where localized disturbances are capable of being generated.

13. The system of claim 11, wherein at least a portion of the contents of the storage has been calibrated to account for a variation of the system.

14. The system of claim 1, wherein the signal generator generates the haptic component signal for each of the remote transmitters at least in part by using a beamforming formula.

15. The system of claim 1, wherein the haptic component signals interfere at a second location of interest such that a second localized disturbance is generated at the second location of interest.

16. The system of claim 1, wherein the generation of the localized haptic disturbance is selectively enabled and disabled based on a power state of the system.

17. The system of claim 1, wherein at least a portion of the generation of the localized haptic disturbance is selectively enabled and disabled based on a detection of a touch input.

18. The system of claim 1, further comprising:
a communication interface configured to receive the freely propagating ultrasonic touch location signal that has been affected by the touch input on the surface; and
a processor coupled to the communication interface and configured to process the received freely propagating signal to determine a user indication associated with the touch input on the surface.

19. The system of claim 1, wherein the ultrasonic transmitter is included in the plurality of remote transmitters and at least one of the plurality of remote transmitters transmits both the haptic signal and the ultrasonic touch location signal.

20. A method of providing a localized haptic disturbance, comprising:
receive an identifier associated with a location on a surface where the localized haptic disturbance is desired;
using the identifier to obtain one or more signal configurations to be used to provide the localized haptic disturbance;
generating a haptic component signal for each of a plurality of transmitters, wherein the transmitters propagate the haptic component signals through a touch screen medium of the surface and the haptic signals interfere at the location of interest such that a localized haptic disturbance is generated at the location of interest and the localized haptic disturbance is generated by an interference of the haptic component signals at the location of interest without a use of a motor and the interference of the haptic component signals that generated the localized haptic disturbance is substantially localized to the location of interest to generate the localized haptic disturbance that is substantially isolated to the location of interest; and
an ultrasonic transmitter that transmits an ultrasonic touch location signal, wherein the ultrasonic touch location signal is allowed to freely propagate in multiple directions through the touch screen medium of the surface of the system, the ultrasonic touch location signal is utilized to detect a location of a touch input and the ultrasonic touch location signal is different from the haptic component signal.

* * * * *